June 29, 1965   O. E. LIND, JR   3,191,512
EXPOSURE CONDITION INDICATION AND WARNING
Filed Nov. 14, 1960
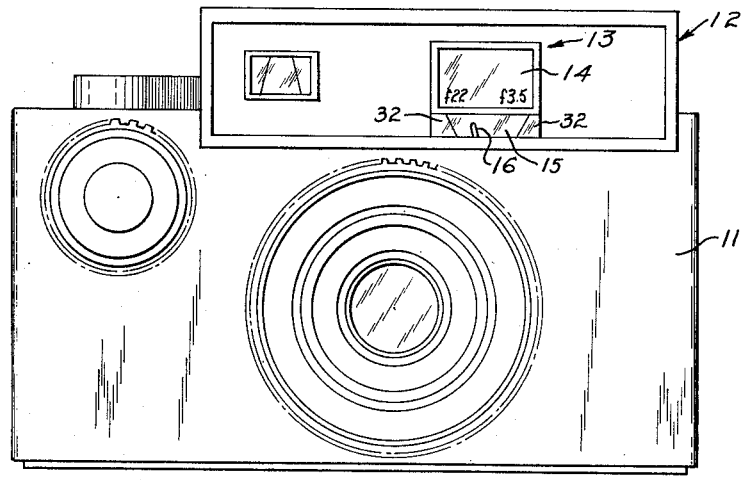
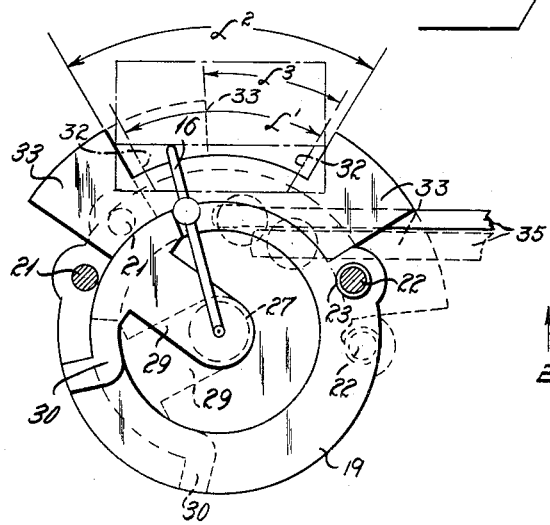
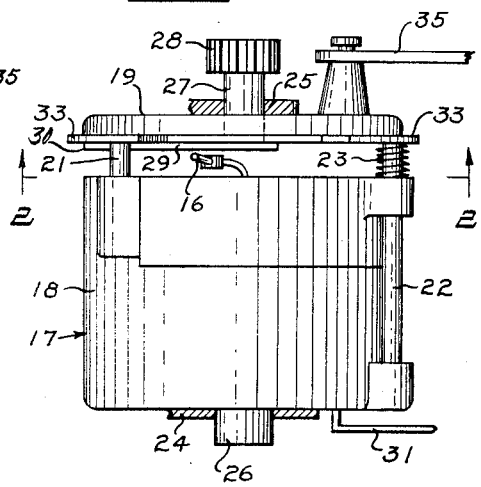
INVENTOR
ORBIE E. LIND, JR.
BY Strauch, Nolan & Neale
ATTORNEYS United States Patent Office 3,191,512
Patented June 29, 1965

3,191,512
EXPOSURE CONDITION INDICATION
AND WARNING
Orbie E. Lind, Jr., Ann Arbor, Mich., assignor, by mesne assignments, to Mansfield Industries, Inc., Chicago, Ill., a corporation of Delaware
Filed Nov. 14, 1960, Ser. No. 68,968
5 Claims. (Cl. 95—11)

This invention relates to automatic exposure control in cameras and particularly to a warning system which indicates to the operator when the automatic exposure setting is inadequate for proper picture taking.

In the usual automatic exposure control for cameras today the diaphragm opening is directly controlled by a meter operated by light sensitive means which may be for example a photocell directly generating electric current in response to incident light or a circuit or system wherein a light sensitive element valves current in circuit with a source of power. However, in order to effect proper exposure of the film, the automatic diaphragm setting must correlate to the associated factors of film speed, shutter speed and other exposure variables necessary to consider in dependent relation. If the measured brightness at the meter results in a diaphragm opening setting that does not fall within a range where it is correctly related to the other exposure condition factors, then the automatic setting and therefore the exposure if made are improper. The present invention provides a warning system wherein the operator is warned whenever the automatic exposure control produces a camera exposure setting which is improper, and the operator is advised automatically of the exposure limitations of the existing combination of exposure factors so that he may take steps to adjust to correct exposure if such is possible.

In automatic exposure control for cameras usually all of the various exposure factors except one such as the diaphragm opening are set in by manual adjustment, and the light sensitive means automatically varies the diaphragm opening to select the optimum opening for the existing combination of exposure factors. Limitations are placed on this automatic control by the camera diaphragm and the meter itself and the present invention is concerned with determining whether those limitations will affect the exposure.

The invention makes possible the use of a less expensive meter which is not capable of measuring all possible light values that might combine with the different settings of the exposure factors, and at the same time warns the operator when the meter limitations are exceeded.

It is therefore the major object of the invention to provide a novel warning system in an automatic exposure control camera which indicates to the operator the existence of combinations of exposure control setting and other factors contributing to picture taking of reduced quality.

Another object of the invention is to provide in an automatic exposure control camera wherein the diaphragm opening is automatically selected according to the measured brightness of the scene to be photographed and the existence of exposure limitations for various combinations of other exposure factors is signaled to the operator.

It is another object of the invention to provide, in an automatic exposure control camera wherein a meter operated by light sensitive means sets the diaphragm opening, a warning system that indicates when the associated shutter speed, film speed and other exposure factors will not properly combine with that setting of the diaphragm to provide a proper exposure of the film.

Another object of the invention is to provide, in an automatic exposure control camera wherein a meter operated by light sensitive means automatically adjusts the diaphragm opening according to measured scene brightness, an automatic warning system which operatively correlates with the meter pointer viewed through the usual view finder.

It is a further object of the invention to provide a novel exposure indicating and warning system in an automatic exposure control camera wherein the pointer of a meter operated by light sensitive means is visible through the view finder, the meter is adjustably mounted to set in corrections for film speed, shutter speed and like exposure factors, and wherein the meter carries a signal, which may be one or more color devices, that shifts during meter adjustment and coacts with the pointer to indicate the condition.

Another object of the invention is to provide in an automatic exposure control camera wherein a light sensitive means operates a meter coupled to the diaphragm opening adjustment, indicator means showing when the measured light is within the diaphragm range and associated indicator means showing when the automatic diaphragm setting combines with the other exposure factors to obtain a proper exposure.

Further objects of the invention will appear as the description proceeds in connection with the appended claims and the annexed drawings wherein:

FIGURE 1 is a diagrammatic front elevation of a camera employing the invention;

FIGURE 2 is a section on line 2—2 of FIGURE 3 showing the meter mounted signal means in operative association with the view finder and meter pointer; and FIGURE 3 is a plan view of the meter mounting and structure.

Referring to FIGURE 1 the camera 11 has a combined range and view finder assembly mounted on the upper end at 12 with the larger view finder window indicated at 13.

This window 13 is rectangular with an upper clear rectangular space 14 in which the operator views the scene to be photographed and a lower relatively narrow space 15 at which the operator may check exposure by noticing the movable pointer 16 of a meter assembly 17.

The meter housing 18 houses the usual rotatable armature (not shown) carrying the pointer 16, and housing 18 is mounted for reciprocation toward and from a plate 19 that is essentially one side of the housing by spaced posts 21, 22 on the plate slidably entering sockets on the housing, a compression spring 23 biasing the housing away from the plate.

The housing 18 and plate 19 are coaxially journalled in fixedly spaced bracket arms 24, 25 with the end housing boss 26 being axially slidable in bracket arm 24. The meter is operably connected to a suitable light sensitive means such as a photocell measuring the brightness of the scene to be photographed.

A shaft 27 freely journalled in plate 19 coaxially on the axis of rotation of the meter assembly carries a gear 28 on the outer side for operable connection to the camera diaphragm opening adjustment (not shown), and a follower 29 on the inner side. In operation, with the camera shutter cocked and the diaphragm wide open, the shutter release button is pressed. This results in a clamp arm 31 advancing to push the meter housing and plate 19 together to arrest pointer 16 in the indicated measured light position it has assumed, and follower 29 driven around by the closing diaphragm is arrested when it encounters the stopped pointer as shown in FIGURE 2, thus holding the diaphragm open at that position for the exposure being made.

The follower 29 has an arcuate portion 30 of sufficient circumferential extent to keep the follower from moving if the measured light is too low. The reason for this is that, with the diaphragm wide open and spring biased toward closed position, if the meter pointer indicates only a very small amount of light from the scene to be photographed, advance of the housing 18 to clamp the pointer will also trap the follower section 30 and prevent any closing movement of the diaphragm, thus obtaining the best possible diaphragm opening condition for the available light, regardless of whether or not it is adequate for proper exposure.

The present invention is an improvement providing an indication visible to the operator looking through the camera view finder of when the automatic exposure setting of the diaphragm is possible and in correct accord with the other exposure factors for the available light.

The view finder area 15 has two colored side areas 32 (red) which are fixed with downwardly converging inner edges defining the sides of a clear space into which the pointer 16 projects when activated. As illustrated this clear space is essentially a sector defined by the angle $\alpha^1$, and if the pointer 16 in response to measured light moves into this clear space this is an indication to the operator that a proper exposure may be made within the limitation of the diaphragm adjustment range. If the pointer falls behind either red area 32 it is not possible to obtain a proper exposure under existing light conditions.

Secured on plate 19 are two fixedly circumferentially spaced transparent colored (red) tabs 33 that normally project up behind the red areas 32 in the finder and are not visible through the finder unless to indicate that the manually introduced exposure factor adjustments introduce further limitations to the exposure. The angle $\alpha^2$ is usually greater than $\alpha^1$.

Attached to plate 19 is a drive link 35 connected by means (not shown) to suitable adjustments for the film speed and the shutter speed in the camera, and upon effecting the desired film speed or shutter speed setting adjustment the entire meter assembly is rotated on its journals. This angularly displaces the tabs 33. If the light measured is too low or excessive so that stopping the diaphragm opening at the place determined by the current clamped pointer position does not properly correlate with the other exposure factors, the pointer will be visible to the operator through the finder masked in one of the red areas 33 which now has been shifted as shown by the dotted lines in FIGURE 2 into position in front of the clamped pointer.

Looking through the view finder the operator, after the film speed and shutter speed adjustments have been made, sees the clear proper exposure region between the red edge areas, and this region indicates the available operating range of the automatic diaphragm setting control. If the pointer 16 is in this corrected exposure region shown by $\alpha^3$ in FIGURE 2 the automatic exposure will be correct, and he then can proceed to safely make the exposure.

If the operator sees the pointer 16 in a red area 33 as dotted in FIGURE 2, that is a signal that the exposure will not be correct for the current combination of exposure factor adjustments, but that it is possible to arrive at a proper combination of exposure factors by suitable manual adjustment of one of the non-automatic factors. The operator can then override the automatic setting as by adjusting the usual shutter speed control on the camera, thereby rotating the meter assembly about its axis and shifting the left tab 33 of FIGURE 2 counterclockwise relative to the field of view in the view finder until the pointer 16 becomes visible in the clear area between the color edge fields at space 15. Now the camera exposure factors are all in correct adjustment. If the clamped pointer lies behind either of the fixed red areas 33 however, no adjustment of the shutter speed will result in a correct exposure. It is of course not possible to change the film speed adjustment for this compensation since the film is in the camera.

Actually, for normal practice of the invention only the indicator areas 32, 33 at the left (low light) side of FIGURE 2 are absolutely necessary because under the picture taking conditions the light is hardly ever excessive and exposure problems arise only when the light level is low.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a camera, a view finder, a photocell actuated meter assembly mounted for pivotal adjustment, means connecting the meter to automatically determine the diaphragm opening according to measured scene brightness, means for adjusting the meter assembly about its pivot to correct for exposure factors, a pointer on said meter extending into the field of view in said finder, relatively stationary laterally spaced signal means in said field of view defining a range coacting with the pointer to indicate limitations of automatic diaphragm adjustment for proper automatic exposure, and signal means movable with said meter assembly during adjustment to extend into said field of view and vary the extent of said range.

2. In an automatic exposure control camera having a sight passage, a meter operated by light sensitive means to displace a pointer extending into said passage, means providing fixed laterally spaced signal areas in said passage to define limits of pointer movement range within which the diaphragm may be set for proper automatic operation, means adjusting said meter to introduce exposure factor adjustments, and further signal means movable with the meter for coacting with the fixed signal areas to provide in the passage a corrected exposure indication region of pointer movement.

3. In an automatic exposure control camera having a view finder, means defining in the field of view of an operator looking through the finder two fixed laterally spaced signal regions defining between them a relatively clear region, a meter assembly operated by light sensitive means having a movable indicator pointer extending up into said field of view of the finder and mounted for rotative adjustment for introducing exposure factor corrections, and at least one signal member on said meter assembly extending up into the view finder and movable with the meter assembly for coaction with said fixed signal regions in said finder to reduce the lateral extent of said clear region.

4. In the camera defined in claim 3, there being two signal members on said meter assembly projecting up into the finder, said two signal members being circumferentially spaced in fixed angular relation on said meter assembly, and the spacing being angularly greater than said fixed regions in the finder.

5. In a camera, a view finder, a photocell actuated meter assembly mounted for pivotal adjustment, means connecting the meter to automatically determine the diaphragm opening according to measured scene brightness, means for adjusting the meter assembly about its pivot to correct for exposure factors, a pointer on the meter extending into the field of view in said finder, relatively stationary laterally spaced signal means in said field of view defining a range coacting with the pointer to indicate limitations of automatic diaphragm adjustment for proper automatic exposure, and signal means movable with said meter assembly during adjustment to extend into said field of view and vary the extent of said range, said stationary signal means comprising colored areas and said movable signal means being a transparent color flag extending from the meter assembly into the view finder.

References Cited by the Examiner

UNITED STATES PATENTS

| | | | |
|---|---|---|---|
| 2,058,532 | 10/36 | Tuttle | 95—64 X |
| 2,841,064 | 7/58 | Bagby | 95—10 |
| 2,902,968 | 9/59 | Barthruff | 95—10 |
| 2,969,004 | 1/61 | Gebele | 95—10 |
| 2,981,165 | 4/61 | Estes | 95—10 |
| 3,044,377 | 7/62 | Gebele | 95—10 |

NORTON ANSHER, *Primary Examiner.*

JOHN M. HORAN, *Examiner.*

UNITED STATES PATENT OFFICE
CERTIFICATE OF CORRECTION

Patent No. 3,191,512  June 29, 19

Orbie E. Lind, Jr.

It is hereby certified that error appears in the above numbered patent requiring correction and that the said Letters Patent should read as corrected below.

In the grant, lines 2 and 3, for "assignor, by mesne assignments, to Mansfield Industries, Inc., of Chicago, Illinoi a corporation of Delaware," read -- assignor, by mesne assignments, to Argus Incorporated, a corporation of Delaware, --; line 12, for "Mansfield Industries, Inc., its successors" read -- Argus Incorporated, its successors --; in the heading to the printed specification, lines 4 to 6, for "assignor, by mesne assignments, to Mansfield Industries, Inc., Chicago, Ill., a corporation of Delaware" read -- assignor, by mesne assignments, to Argus Incorporated, a corporation of Delaware --

Signed and sealed this 7th day of December 1965.

(SEAL)
Attest:

ERNEST W. SWIDER
Attesting Officer

EDWARD J. BRENNER
Commissioner of Patents